(12) United States Patent
Yamauchi

(10) Patent No.: US 9,185,201 B2
(45) Date of Patent: Nov. 10, 2015

(54) COMMUNICATION SYSTEM AND MOBILE COMMUNICATION DEVICE, AND SERVER FOR COMMUNICATION SYSTEM

(75) Inventor: Atsushi Yamauchi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 646 days.

(21) Appl. No.: 13/575,087

(22) PCT Filed: Jan. 27, 2011

(86) PCT No.: PCT/JP2011/051663
§ 371 (c)(1),
(2), (4) Date: Jul. 25, 2012

(87) PCT Pub. No.: WO2011/093408
PCT Pub. Date: Aug. 4, 2011

(65) Prior Publication Data
US 2012/0295638 A1    Nov. 22, 2012

(30) Foreign Application Priority Data

Jan. 27, 2010    (JP) .................................. 2010-016066

(51) Int. Cl.
*H04W 24/00* (2009.01)
*H04M 1/725* (2006.01)
*H04W 4/00* (2009.01)
*H04W 8/00* (2009.01)

(52) U.S. Cl.
CPC ............ *H04M 1/7253* (2013.01); *H04W 4/008* (2013.01); *H04W 8/005* (2013.01); *H04M 1/72566* (2013.01)

(58) Field of Classification Search
CPC .......... H04M 1/7253; H04M 1/72566; H04W 8/005; H04W 4/008
USPC .......... 455/456.1, 456.2, 456.3, 456.4, 456.5, 455/456.6
See application file for complete search history.

(56) References Cited

U.S. PATENT DOCUMENTS

| | | | |
|---|---|---|---|
| 8,073,484 B2 * | 12/2011 | Sagou et al. | 455/552.1 |
| 2003/0054821 A1 * | 3/2003 | Kita et al. | 455/435 |
| 2011/0076949 A1 * | 3/2011 | Smith | 455/41.2 |

FOREIGN PATENT DOCUMENTS

| | | | |
|---|---|---|---|
| JP | 2004355349 A | 12/2004 | |
| JP | 2006211014 A | 8/2006 | |

(Continued)

OTHER PUBLICATIONS

International Search Report and Written Opinion for PCT/JP2011/051663, dated Feb. 22, 2011.

*Primary Examiner* — Shahriar Behnamian
(74) *Attorney, Agent, or Firm* — Hauptman Ham, LLP

(57) ABSTRACT

According to an aspect, communication system includes a server and a first mobile communication device. The server is configured to transmit, when acquiring a search request of a mobile communication device, search information related to the search request to the first mobile communication device. The first mobile communication device includes: a first communication unit for communicating with the server, a second communication unit for communicating with a mobile communication device by short-range wireless communication to acquire device information related to the mobile communication device including at least identification information thereof, and a storage unit for storing the device information, and configured to transmit, when receiving the search information, the device information related to a target of the search request to the server.

9 Claims, 17 Drawing Sheets

(56) References Cited

FOREIGN PATENT DOCUMENTS

| JP | 2006270629 A | 10/2006 |
| JP | 2007011555 A | 1/2007 |
| JP | 2008206025 A | 9/2008 |

* cited by examiner

FIG.2

| NAME | ID | TELEPHONE NUMBER | EMAIL ADDRESS |
|---|---|---|---|
| A | 00 | 090-××××-×××× | A@dekome.co.jp |
| B | 01 | 090-△△△△-××△× | B@dekome.co.jp |
| ⋮ | ⋮ | ⋮ | ⋮ |

FIG.3

| NAME | PARENT | | | NAME | CHILD | | |
| --- | --- | --- | --- | --- | --- | --- | --- |
| | ID | TELEPHONE NUMBER | EMAIL ADDRESS | | ID | TELEPHONE NUMBER | EMAIL ADDRESS |
| A | 00 | 090-××××-×××× | A@dekome.co.jp | a | 50 | 090-×××△×-△×××× | a@dekome.co.jp |
| B | 01 | 090-△△△△-××△× | B@dekome.co.jp | b | 51 | 090-△△×△×-△△×△ | b@dekome.co.jp |
| ... | ... | ... | ... | ... | ... | ... | ... |

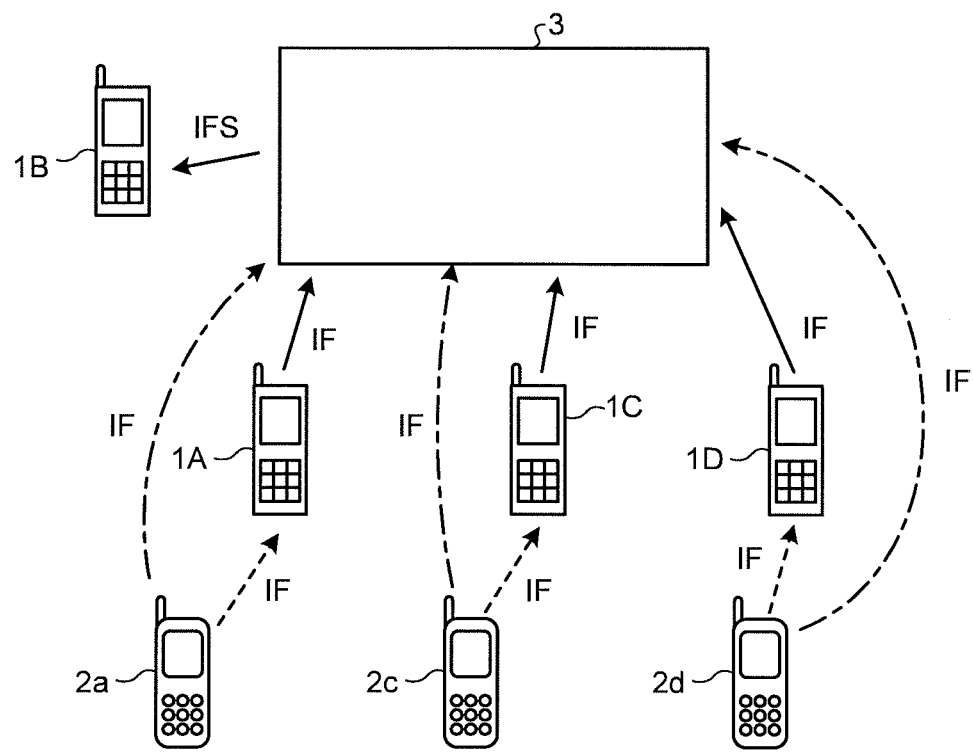

IF (IFS)

| ID | LOCATION | TIME |
|----|----------|------|
| 51 | △△△△ | ○○:△△ |

COMMUNICATION SYSTEM AND MOBILE COMMUNICATION DEVICE, AND SERVER FOR COMMUNICATION SYSTEM

CROSS-REFERENCE TO RELATED APPLICATION

This application is a National Stage of international application No. PCT/JP2011/051663 filed on Jan. 27, 2011 which designates the United States, and which is based upon and claims the benefit of priority from Japanese Patent Application No. 2010-016066, filed on Jan. 27, 2010.

FIELD

The present disclosure relates to a technology for managing a plurality of mobile communication devices and giving help (support) upon searching for the whereabouts of a group of mobile communication devices as necessary.

BACKGROUND

There is a technology for, when a child becomes lost, supporting a search for the lost child by use of a mobile phone. For example, Patent Literature 1 discloses a method for supporting a lost child by causing a lost-child candidate and his/her guardian, who are visitors, to carry a lost-child emblem in which information is recorded in advance, reading the information of the lost-child emblem with a mobile terminal carried by on-site staff and/or the guardian when the child becomes lost, transmitting lost-child protection information and/or a lost-child notice to a management server via email, sending and receiving an email between the management server and the mobile terminal, and searching for and protecting the lost child.

CITATION LIST

Patent Literature

Patent Literature 1: Japanese Patent Application Laid-Open No. 2007-011555 [0012]

Technical Problem

The technology disclosed in Patent Literature 1 is effective at theme parks and the like but is inconvenient in everyday life since the lost-child emblem is distributed in advance. Moreover, the technology disclosed in Patent Literature 1 is not sufficient for support upon searching for an unprotected lost child since it presupposes that a lost child is under the care of somebody and the guardian visits him/her to take the lost child. For the foregoing reasons, there is a need for a communication system, a mobile communication device, and a server for the communication system, which are useful for support upon searching for an unfound lost child or the like.

SUMMARY

According to an aspect, communication system includes a server and a first mobile communication device. The server is configured to transmit, when acquiring a search request of a mobile communication device, search information related to the search request to the first mobile communication device. The first mobile communication device includes: a first communication unit for communicating with the server, a second communication unit for communicating with a mobile communication device by short-range wireless communication to acquire device information related to the mobile communication device including at least identification information thereof, and a storage unit for storing the device information, and configured to transmit, when receiving the search information, the device information related to a target of the search request to the server.

According to another aspect, the first mobile communication device is configured to attempt, when receiving the search information, communication with the target of the search request by the second communication unit, and to transmit the device information related to the target of the search request to the server when the communication is established.

According to another aspect, the communication system further includes a second mobile communication device including: a first communication unit for communicating with the first mobile communication device; a second communication unit for communicating with a mobile communication device by short-range wireless communication to acquire the device information related to the mobile communication device including at least the identification information thereof, and a storage unit for storing the device information. The first mobile communication device is configured to transmit the search information to the second mobile communication device when receiving the search information from the server. The second mobile communication device is configured to transmit, when receiving the search information from the first mobile communication device, the device information related to the target of the search request stored in the storage unit of the second mobile communication device to the server.

According to another aspect, the first mobile communication device and the second mobile communication device are associated with each other, the first mobile communication device is configured to transmit the search information to the second mobile communication device associated therewith, and the second mobile communication device is configured to transmit the device information related to the target of the search request stored in the storage unit of the second mobile communication device to the server via the first mobile communication device associated therewith.

According to another aspect, the first mobile communication device and the second mobile communication device are configured to communicate with a mobile communication device by the respective second communication unit to acquire the device information periodically for a predetermined period of time.

According to another aspect, the first mobile communication device and the second mobile communication device are configured to communicate with a mobile communication device by the respective second communication unit to acquire the device information based on a reference time transmitted from a base station.

According to another aspect, the first mobile communication device and the second mobile communication device are configured to attempt, after transmitting the device information in response to the search information, communication with the target of the search request by the respective second communication unit to acquire at least the identification information of the target.

According to another aspect, the first mobile communication device is configured to transmit the acquired identification information to the server as the device information, and the second mobile communication device is configured to transmit the acquired identification information to the server directly or via the first mobile communication device as the device information.

According to another aspect, the second mobile communication device further includes a location detection unit for detecting a location of the second mobile communication device, and is configured to send the device information including information of the location detected by the location detection unit.

According to another aspect, the second mobile communication device is configured to send the device information including the information of the location to the server directly or via the first mobile communication device.

According to another aspect, a mobile communication device includes: a first communication unit for communicating with a server; a second communication unit for communicating with another mobile communication device by short-range wireless communication to acquire device information related to the another mobile communication device of the communication including at least identification information of the another mobile communication device; a storage unit for storing the device information; and a control unit configured to extract, when receiving search information related to a search request of a mobile communication device, the device information related to a target of the search request, and to cause the first communication unit to transmit the extracted device information to the server.

According to another aspect, the mobile communication device is associated with a first mobile communication device, and the first communication unit is configured to receive the search information from the server via the first mobile communication device, and to transmit the device information to the server via the first mobile communication device.

According to another aspect, the mobile communication device is associated a second mobile communication device, and the control unit is configured to cause the first communication unit to transmit the search information to the second mobile communication device when receiving the search information.

According to another aspect, a server for a communication system is for collectively managing a plurality of mobile communication devices, and includes: a storage unit for storing information related to the plurality of mobile communication devices; and a processing unit for upon acquisition of information related to a search request of a mobile communication device associated with the collectively managed mobile communication device, transmitting the information related to the search request to the plurality of mobile communication devices, and acquiring information on the mobile communication device targeted for the search request from a collectively managed mobile communication device having received the information related to the search request and a mobile communication device having received the information related to the search request from the collectively managed mobile communication device.

According to another aspect, the processing unit acquires the information on the mobile communication device targeted for the search request and then transmits search support information to a mobile communication device having transmitted the information related to the search request.

Advantageous Effects of Invention

The present invention can provide a communication system, a mobile communication device, and a server for the communication system, which are useful for support upon searching for an unfound lost child or the like.

BRIEF DESCRIPTION OF DRAWINGS

FIG. 2 is an information table representing an example of information of mobile communication devices for parents that is managed by a server included in the communication system according to the embodiment.

FIG. 3 is a conceptual diagram illustrating corresponding relationships between the information of the mobile communication devices for parents and information of mobile communication devices for children.

FIG. 14 is an explanatory view of the search support processing.

FIG. 15 is a conceptual diagram of search support information transmitted to a search request source.

DESCRIPTION OF EMBODIMENTS

A detailed description will hereinafter be given of the present invention with reference to the drawings. The present invention is not limited by the following description. Components in the description below encompass components that readily occur to those skilled in the art, that are substantially identical, or that fall into so-called equivalent ranges. A mobile phone is taken as an example of a mobile communication device in the following; however, a target to which the present invention is applied is not limited to mobile phones, but may be, for example, PHSs (Personal Handyphone Systems) or PDAs (Personal Data Assistants) having a communication function.

First Embodiment

For example, a case where the whole school or municipality purchases all mobile communication devices such as security terminals and mobile phones for children in one order for the security purpose can be presumed. In such a case, the embodiment supports cases of searching for an unfound lost child or the like, by using a short-range wireless communication technology such as Bluetooth. Specifically, in the embodiment, parents' mobile communication devices are collectively managed by a server or the like, and the location information of children's mobile communication devices is periodically acquired by use of short-range wireless communication between the collectively managed parents' mobile communication devices and children's mobile communication devices associated with them to be accumulated in the mobile communication devices or server. When a child having a mobile communication device associated with the collectively managed parent's mobile communication device becomes lost or the like, and when there is a request to search for him/her, the search for the unfound lost child or the like is supported with the accumulated location information of the child's mobile communication device. A parent's mobile communication device is always associated with a child's mobile communication device. Therefore, the corresponding relationship is used to collectively manage only parents' mobile communication devices; accordingly, a child's personal information leakage is reduced as much as possible.

Figure 1:
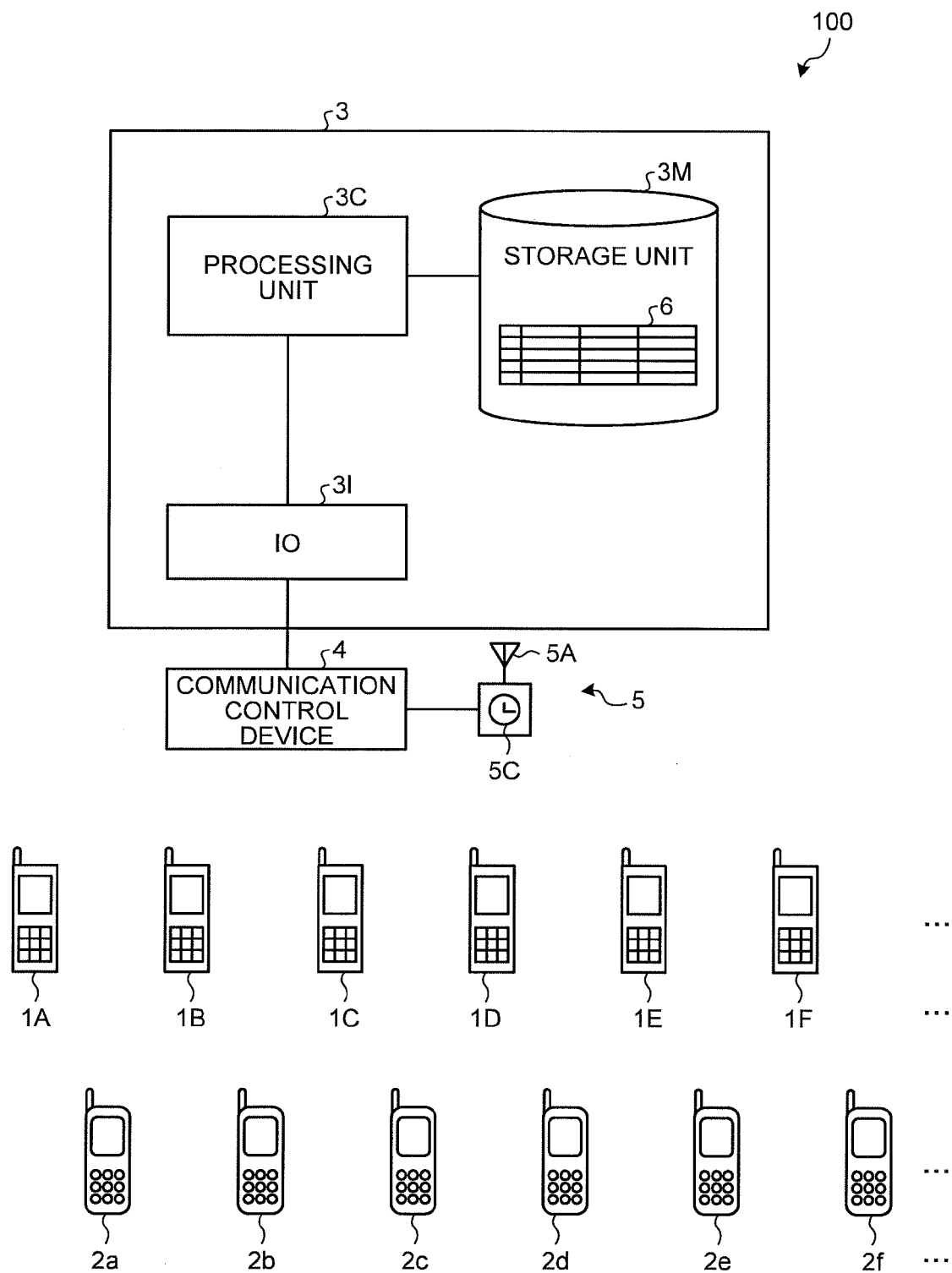
FIG. 1 is a view illustrating a schematic configuration of a communication system according to an embodiment.

FIG. 1 is a view illustrating a schematic configuration of a communication system according to the embodiment. A communication system 100 illustrated in FIG. 1 collectively manages a plurality of mobile communication devices (first mobile communication devices) 1A, 1B and the like. The communication system 100 gives help (support) upon searching for the whereabouts of a search-request target when a request to search for any of mobile communication devices (second mobile communication devices) 2a, 2b and the like that are associated respectively with the plurality of collectively managed mobile communication devices 1A and the like, is made.

As illustrated in FIG. 1, the communication system 100 includes the plurality of mobile communication devices 1A, 1B and the like, the plurality of mobile communication devices 2a, 2b and the like, and a server 3. In the embodiment, the plurality of first mobile communication devices 1A, 1B and the like are mobile communication devices used by parents and will hereinafter be referred to as the mobile communication devices for parents. The plurality of second mobile communication devices 2a, 2b and the like are mobile communication devices used by children and will hereinafter be referred to as the mobile communication devices for children. In terms of the mobile communication devices for parents 1A, 1B and the like, and the mobile communication devices for children 2a, 2b and the like, the same alphabets indicate the parent-child relationships and the uppercase letters represent parents and the lowercase letters represent children. For example, the mobile communication device for parents 1A is used by a parent A, and a child a of the parent A uses the mobile communication device for children 2a. In this manner, the alphabets assigned to reference signs 1 and 2 denoting the mobile communication devices are assigned to identify the mobile communication devices for convenience' sake.

The server 3 includes a processing unit 3C, a storage unit 3M, and an input/output unit (IO) 3I. The server 3 is connected to a base station 5 via a communication control device 4 connected to the input/output unit 3I. The base station 5 receives radio waves from the mobile communication devices for parents 1A, 1B and the like and the mobile communication devices for children 2a, 2b and the like, and transmits radio waves to the mobile communication devices for parents 1A, 1B and the like and the mobile communication devices for children 2a, 2b and the like. The base station 5 includes an antenna 5A and reference time generation unit 5C for generating a reference time. The reference time generation unit 5C includes, for example, one that transmits a time acquired from a GPS (Global Positioning System) clock, in other words, an atomic clock installed on a satellite for GPS, and one that transmits a time acquired from a reference station that transmits a time for a radio-controlled clock. The communication control device 4 is responsible for conversion of information, control of transmission/receipt, and the like between the base station 5 and the server 3.

The processing unit 3C included in the server 3 is for controlling the operation of the server 3 and exerting the function of the server 3, and is a computer such as an MPU (Micro Processing Unit). The storage unit 3M stores and accumulates information related to the plurality of mobile communication devices for parents 1A, 1B and the like, information transmitted from the mobile communication devices for parents 1A, 1B and the like, and the mobile communication devices for children 2a, 2b and the like, etc. The information transmitted from the mobile communication devices for parents 1A, 1B and the like, and the mobile communication devices for children 2a, 2b and the like is information (location information, time information, etc.) of the mobile communication devices for parents 1A, 1B and the like, collectively managed by the communication system 100, and the mobile communication devices for children 2a, 2b and the like associated with them. The storage unit 3M is a secondary storage such as an HDD (Hard Disc Drive) device, for example.

FIG. 2 is an information table representing an example of information of the mobile communication devices for parents that is managed by the server included in the communication system according to the embodiment. Information related to the plurality of mobile communication devices for parents 1A, 1B and the like is described in an information table 6 stored in the storage unit 3M. The storage unit 3M is a component of the server 3; accordingly, it is possible to understand that the server 3 stores the information related to the plurality of mobile communication devices for parents 1A, 1B and the like. As illustrated in FIG. 2, the information related to the plurality of mobile communication devices for parents 1A, 1B and the like, which is stored in the information table 6, includes names (parents' names), IDs (device IDs of the mobile communication devices for parents 1A, 1B and the like), telephone numbers, email addresses, and the like.

FIG. 3 is a conceptual diagram illustrating corresponding relationships between the information of the mobile communication devices for parents and the information of the mobile communication devices for children. The corresponding relationships between the mobile communication devices 1A, 1B and the like and the mobile communication devices for children 2a, 2b and the like correspond to the parent-child relationship between the parent A and his/her child a. Therefore, the mobile communication devices for parents 1A, 1B and the like are always associated with the mobile communication devices for children 2a, 2b and the like in the communication system 100. In the embodiment, the communication system 100 stores only the information related to the mobile communication devices for parents 1A, 1B and the like in the server 3 (or more specifically, the storage unit 3M) to manage collectively.

The server 3 can directly access the mobile communication devices for parents 1A, 1B and the like by use of the information described in the information table 6, for example, email addresses. On the other hand, the server 3 does not store information related to the mobile communication devices for children 2a, 2b and the like and accordingly accesses the mobile communication devices for children 2a, 2b and the like via the mobile communication devices for parents 1A, 1B and the like. In this manner, in the embodiment, the server 3 does not have the information related to the mobile communication devices for children 2a, 2b and the like, and cannot directly access the mobile communication devices for children 2a and 2b; accordingly, it is possible to reduce the risk of leakage of information of the mobile communication devices for children 2a and 2b. Consequently, the communication system 100 can effectively suppress leakage of children's personal information.

The mobile communication devices for parents 1A, 1B and the like are associated respectively with the mobile communication devices for children 2a, 2b and the like. The server 3 stores only the information related to the mobile communication devices for parents 1A, 1B and the like, and the mobile communication devices for parents 1A, 1B and the like are directly and collectively managed; however, the mobile communication devices for children 2a, 2b and the like are also indirectly and collectively managed by the server 3 based on the above associations. A plurality of mobile communication devices for children may be associated with one mobile communication device for parents, or a plurality of mobile communication devices for parents may be associated with one mobile communication device for children. The former is, for example, a relationship between one parent's mobile communication device for parents and a plurality of children's mobile communication devices for children, and the latter is, for example, a relationship between both parents' mobile communication devices for parents and one child's mobile communication device for children. Then, a description will be given of the configurations of the mobile communication devices for parents 1A, 1B and the like and the mobile communication devices for children 2a, 2b and the like.

Figure 4:
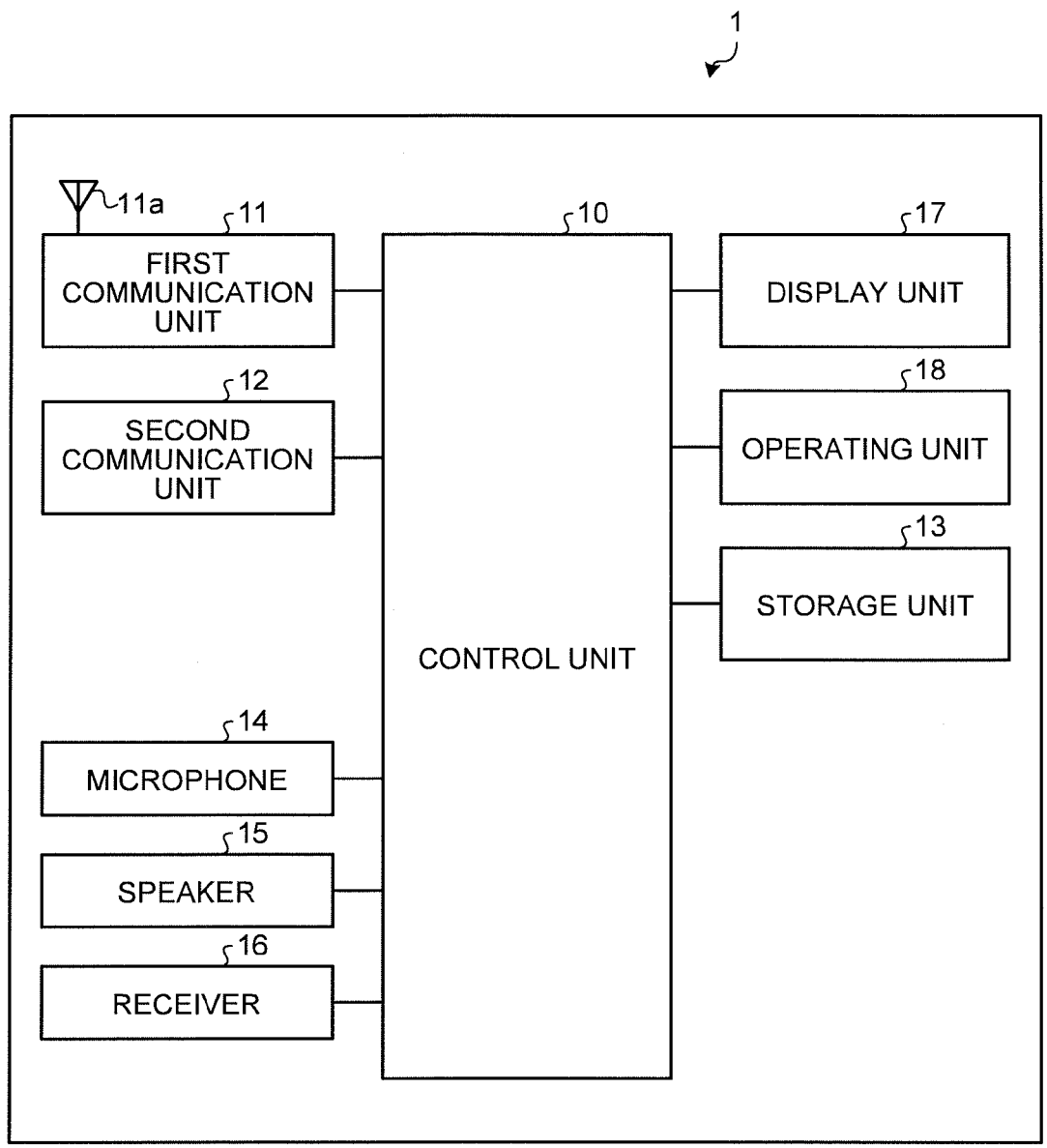
FIG. 4 is a device block diagram of the mobile communication device for parents.
Figure 5:
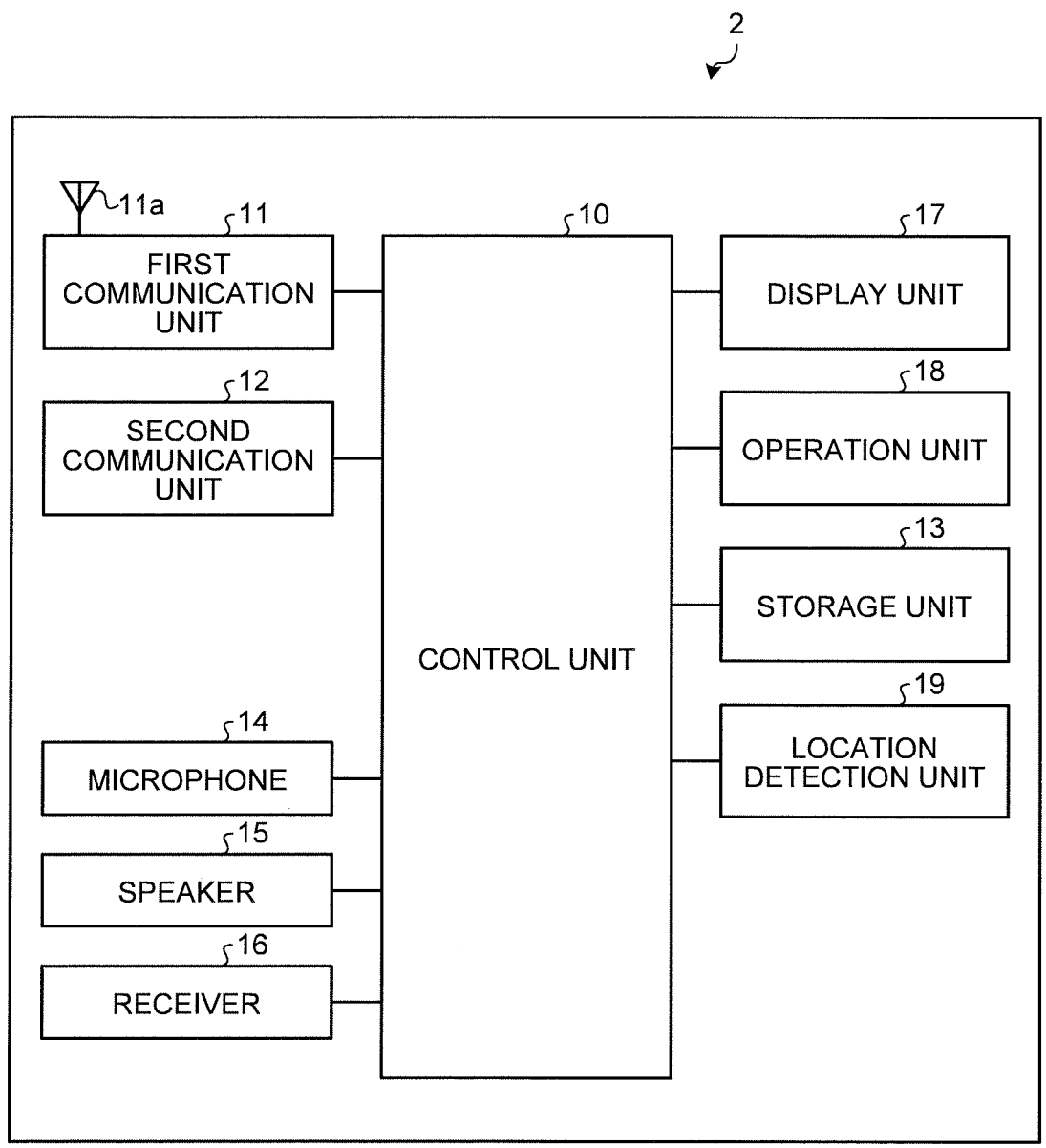
FIG. 5 is a device block diagram of the mobile communication device for children.

FIG. 4 is a device block diagram of the mobile communication device for parents. FIG. 5 is a device block diagram of the mobile communication device for children. The mobile communication device for parents 1 includes a control unit 10, a storage unit 13, a first communication unit 11 to which a terminal antenna 11a is connected, a second communication unit 12, a microphone 14, a speaker 15, a receiver 16, a display unit 17, and an operating unit 18. As illustrated in FIG. 5, the mobile communication device for children 2 is similar to the mobile communication device for parents 1 except that a location detection unit 19 is added to the mobile communication device for parents 1; accordingly, a description will be given only of the mobile communication device for parents 1 except the location detection unit 19.

The control unit 10 has the function of integrally controlling the overall operation of the mobile communication device for parents 1. In other words, the control unit 10 controls the operation of the first communication unit 11, the second communication unit 12, the display unit 17 and the like to execute various processes of the mobile communication device for parents 1 in appropriate procedures. The various processes of the mobile communication device for parents 1 include, for example, a voice call made via a circuit-switched network, composition, transmission, and reception of emails, browsing of a Web (World Wide Web) site on the Internet, and communication and information collection for search support.

The control unit 10 executes processes based on programs stored in the storage unit 13 (for example, an operating system program and an application program), and operations inputted by the operating unit (for example, an operation key) 18. The control unit 10 processes sound signals input into the microphone 14 and sound signals outputted from the speaker 15 and the receiver 16. The display unit (for example, a liquid crystal panel) 17 causes a display panel to display video in accordance with video data and an image in accordance with image data, the data being supplied from the control unit 10.

The control unit 10 includes, for example, a micro processing unit (MPU: Micro Processing Unit), and executes the above-mentioned various processes of the mobile communication device for parents 1 in compliance with a procedure directed by software for executing the search support processing according to the embodiment. In other words, the control unit 10 successively reads operation codes from the operating system program, the application program and the like, which are stored in the storage unit 13, to execute the processes.

Software and data, which are used for the processes by the control unit 10, are stored in the storage unit 13. Information collected for search support is stored in the storage unit 13. A computer program and temporary data, which are used in the process step of software, are temporarily stored in a work area allocated by the control unit 10 to the storage unit 13. The storage unit 13 is configured of, for example, a nonvolatile storage device (such as a nonvolatile semiconductor memory including a ROM: Read Only Memory and a hard disk device), and a readable and writable storage device (for example, an SRAM: Static Random Access Memory, and a DRAM: Dynamic Random Access Memory).

The first communication unit 11 establishes a wireless signal path by CDMA (Code Division Multiple Access) system and the like with a base station via a channel allocated by the base station, and performs telephone communication and information communication with the base station 5 illustrated in FIG. 1. The first communication unit 11 can access the server 3 illustrated in FIG. 1 via the base station 5 to exchange information between both parties. The second communication unit 12 is short-range wireless communication unit, and can perform direct wireless information communication between mobile communication devices in a distance of several m to several tens m to exchange information. In this manner, the mobile communication device for parents 1 can realize both of communication between mobile communication devices via a base station and direct communication between mobile communication devices not via a base station.

The location detection unit 19 included in the mobile communication device for children 2 illustrated in FIG. 5, for example, acquires a signal from a GPS satellite to detect its own location, and/or acquires the location information of a plurality of base stations to detect its own location. Alternatively, for example, IC tags in which the location information of a park, a utility pole, and the like is stored may be attached to the park, the utility pole and the like. When the mobile communication device for children 2 comes close to the IC tag, the location detection unit 19 may read out the location information stored in the IC tag to detect its own location. The own location detected by the location detection unit 19 is, for example, stored in the storage unit 13, transmitted by the control unit 10 to another mobile communication device for children 2 or the mobile communication device for parents 1 illustrated in FIG. 4 via the second communication unit 12, and the like.

Then, a description will be given of the search support processing according to the embodiment. This is realized by the communication system 100. A group of the plurality of mobile communication devices for parents 1 and the plurality of mobile communication devices for children 2 are hereinafter referred to as a collective management terminal group. When the mobile communication device for parents 1 and the mobile communication device for children 2 in the collective management terminal group are not distinguished, they are referred to as an in-group terminal device as necessary.

The search support processing according to the embodiment includes information collection processing and search support processing. The communication system 100 executes the information collection processing and the search support processing to support a search for an unfound lost child or the like. The information collection processing is processing where before a request to search for a lost child or the like is made, the mobile communication device for parents 1 and the mobile communication device for children 2 acquire the location information except for their own to accumulate the information in their own storage unit 13 or the server 3 while associating the information with the acquisition time. The search support processing is processing where when a request to search a lost child or the like is made, the location information of the mobile communication device for children 2 targeted for a search is extracted from the accumulated location information and is, for example, transmitted to the request source of the search request (search request source) to support a search for a lost child or the like.

Figure 6:
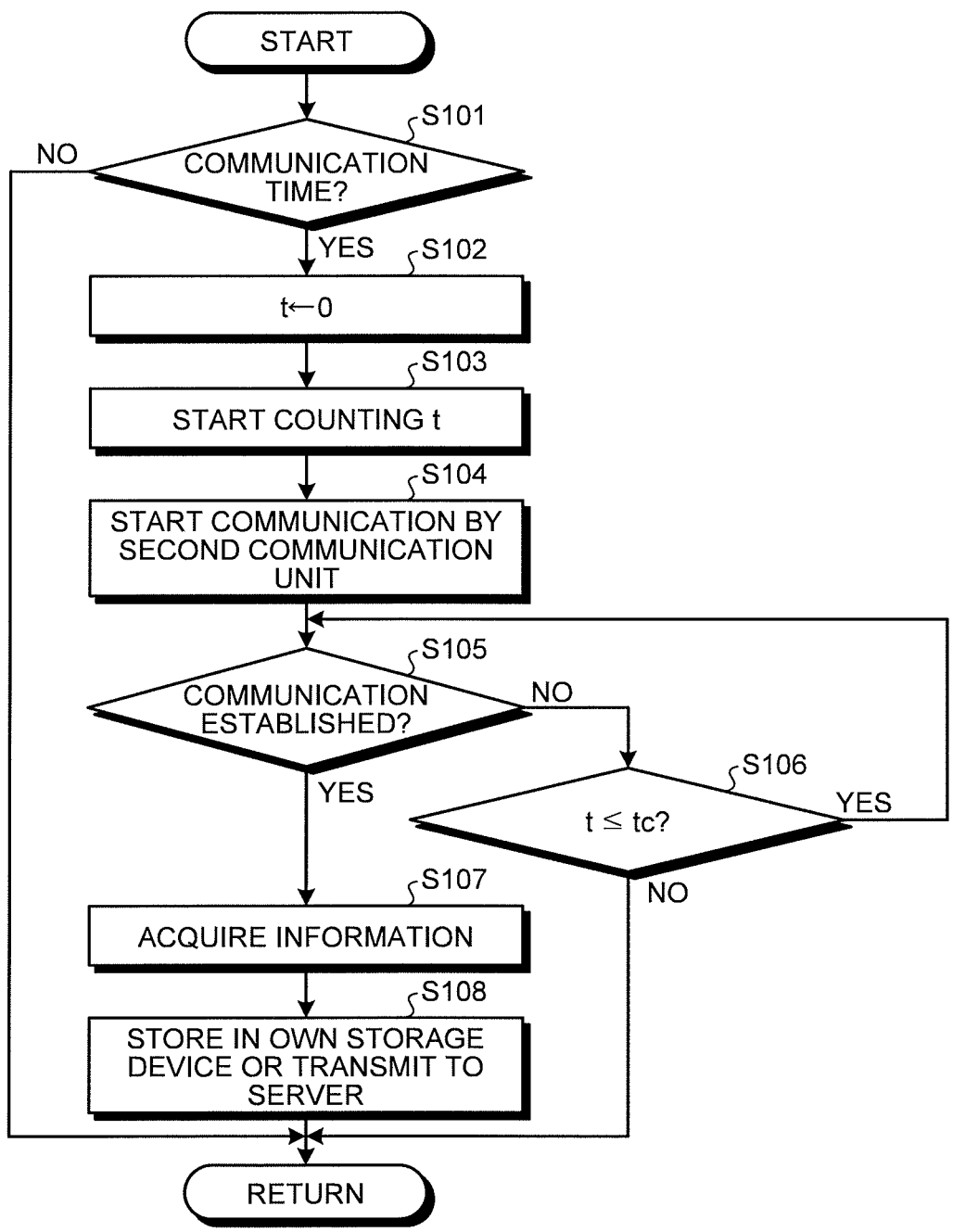
FIG. 6 is a flowchart illustrating the steps of information collection processing executed by the communication system.
Figure 7:
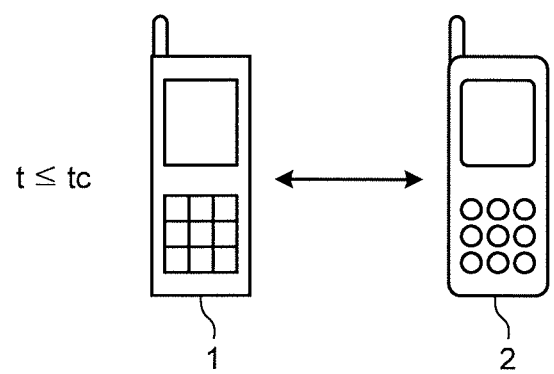
FIG. 7 is an explanatory view of timing to execute short-range wireless communication in the information collection processing.
Figure 8:
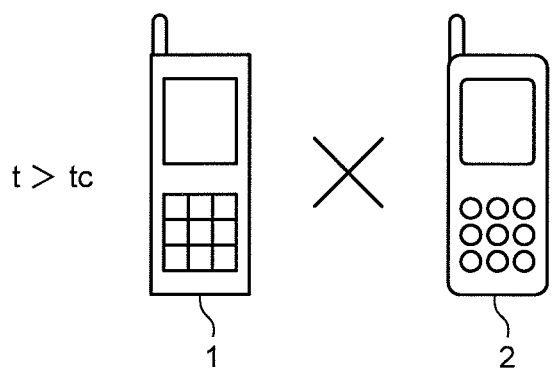
FIG. 8 is an explanatory view of timing to execute short-range wireless communication in the information collection processing.
Figure 9:
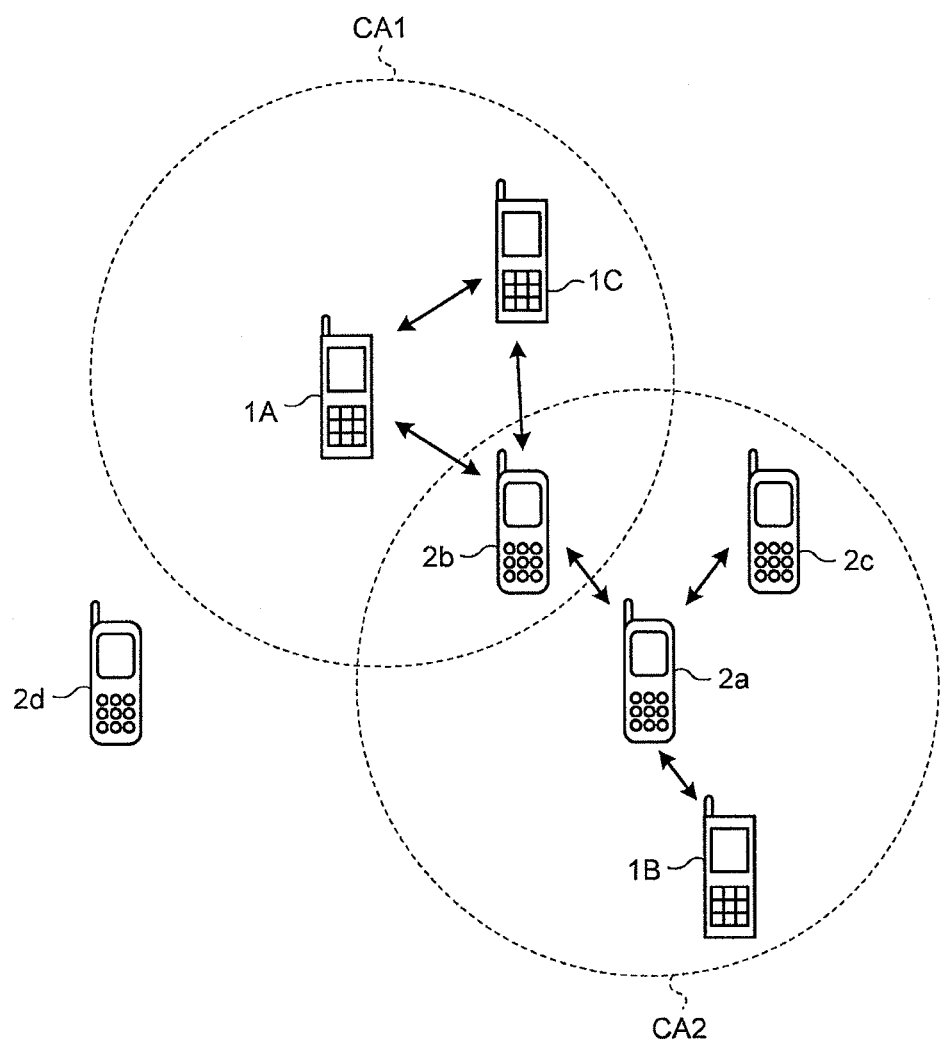
FIG. 9 is a conceptual diagram of short-range wireless communication executed in the information collection processing.

FIG. 6 is a flowchart illustrating the steps of the information collection processing executed by the communication system. FIGS. 7 and 8 are explanatory views of timing to execute short-range wireless communication in the information collection processing. FIG. 9 is a conceptual diagram of short-range wireless communication executed in the information collection processing. In the embodiment, the information collection processing is not always executed, but is periodically executed for a predetermined period of time. When the information collection processing is always executed, the power consumption of the mobile communication device for parents 1 and the mobile communication device for children 2 is significantly increased. Therefore, the information collection processing is periodically executed for a predetermined period of time to suppress an increase in the power consumption. When the power consumption does not matter, the information collection processing may always be executed. In this case, more information can be obtained; accordingly, the accuracy to identify a search target is increased in a search for an unfound lost child or the like.

In the information collection processing, communication is established by the second communication unit 12 with another mobile communication device; however, communication ports of both communication targets need to be open at the time of communication. Therefore, it is necessary in the communication system 100 that the plurality of collectively managed mobile communication devices for parents 1 and the mobile communication devices for children 2 associated with them are simultaneously in a state of being able to communicate once a communication time comes.

Upon execution of the information collection processing, at Step S101, the control unit 10 of the mobile communication device for parents 1 and the control unit 10 of the mobile communication device for children 2 determine whether or not a communication time of the information collection processing has come, respectively. At this time, each control unit 10 acquires the reference time from the reference time generation unit 5C of the base station 5 illustrated in FIG. 1 via the first communication unit 11 to determine whether or not the communication time has come. Assume that the communication time is, for example, every one minute, and the communication period is, for example, 1 second to 15 seconds. In other words, in the information collection processing, the plurality of mobile communication devices for parents 1 and the mobile communication devices for children 2 associated with them communicate by use of the second communication unit 12 every one minute for a predetermined period to acquire the information. Accordingly, the collective management terminal group becomes possible to communicate at fixed times without fail and therefore it is possible to reduce the failure of information collection as well as suppress the power consumption.

When the control unit 10 of each in-group terminal device determines that it is not the communication time (Step S101, No), return to START. When the control unit 10 of each in-group terminal device determines that it is the communication time (Step S101, Yes), the control unit 10 proceeds to Step S102. The control unit 10 of each in-group terminal device sets an elapsed time t to 0. At Step S103, the control unit 10 of each in-group terminal device starts counting the elapsed time t and then proceeds to Step S104 to start communication with another in-group terminal device by use of the second communication unit 12 of each in-group terminal device.

At Step S105, the control unit 10 of each in-group terminal device determines whether or not communication with another in-group terminal device has been established. When the control unit 10 of each in-group terminal device determines that communication has not been established (Step S105, No), the control unit 10 proceeds to Step S106. At Step S106, the control unit 10 of the in-group terminal device that has not established communication determines whether or not the elapsed time t is equal to or less than a communication enabled time tc. The communication enabled time tc is a time during which communication by the second communication unit 12 becomes possible after the communication time has come in the information collection processing, and is, for example, set to 1 second to 15 seconds. In other words, in the information collection processing, an interval between the communication time and the time after the communication enabled time tc is a time during which communication by the second communication unit 12 becomes possible.

When the control unit 10 of the in-group terminal device that has not established communication determines that t≤tc (Step S106, Yes), the control unit 10 of the in-group terminal device that has not established communication attempts communication by the second communication unit 12 until t becomes larger than tc. When the control unit 10 of the in-group terminal device that has not established communication determines that t>tc (Step S106, No), the control unit 10 returns to START to restart the information collection processing.

When the control unit 10 of each in-group terminal device determines that communication has been established (Step S105, Yes), the control unit 10 proceeds to Step S107. The control unit 10 of the in-group terminal devices that have established communication with each other acquires at least identification information of the in-group terminal device targeted for communication via their respective second communication unit 12. In the embodiment, both of identification number and location information are acquired. The identification information indicates information to identify the mobile communication device for parents 1 or the mobile communication device for children 2, and is, for example, a device ID. The location information is information indicating the location of the mobile communication device for parents 1 or the mobile communication device for children 2 upon information acquisition, and is, for example, a latitude and longitude, or an address. The location information is detected by the location detection unit 19 of the mobile communication device for children 2. Acquiring also the location information is extremely effective to identify the location and trace of the mobile communication device for children 2 targeted for the search request in the search support for a lost child or the like and accordingly is more preferable than acquiring only the identification information. At Step S107, after the acquisition of the identification information and the location information, the control unit 10 of the in-group terminal devices that have established communication with each other may establish communication with still another in-group terminal device to acquire the identification information and the location information if the communication enabled time tc has not elapsed.

In the embodiment, until the communication enabled time tc elapses, as illustrated in FIG. 7, communication between the in-group terminal devices (between the mobile communication device for parents 1 and the mobile communication device for children 2 in this example) becomes possible, and communication with another in-group terminal device is attempted at Step S106. Then, after a lapse of the communication enabled time tc, as illustrated in FIG. 8, communication between the in-group terminal devices (between the mobile communication device for parents 1 and the mobile communication device for children 2 in this example) is not established, and communication with another in-group terminal device is not attempted at Step S106. In this manner, in the embodiment, a predetermined period of time (the communication enabled time tc) after a time to start communication in the information collection processing is allocated to short-range wireless communication that uses the second communication unit 12 to suppress the power consumption of the in-group terminal device.

In the example illustrated in FIG. 9, for example, the mobile communication device for parents 1A can establish communication with the mobile communication device for parents 1C and the mobile communication device for children 2b and accordingly transmits and receives the identification information and the location information to and from one selected in accordance with predetermined order of precedence (for example, one that establishes communication first). The mobile communication device for parents 1B can establish communication with the mobile communication device for children 2a and accordingly the identification information and the location information are transmitted to and received from each other.

In the information collection processing, the second communication unit 12 being short-range wireless communication unit is used. CA1 illustrated in FIG. 9 represents an area that the second communication unit 12 included in the mobile communication device for parents 1A can communicate, and CA2 represents an area that the second communication unit 12 included in the mobile communication device for children 2a can communicate. For example, a distance that the second communication unit 12 can communicate is approximately several m to several tens m; accordingly, the communication possible areas CA1 and CA2 are within a circle with a radius of several m to several tens m. In the example illustrated in FIG. 9, the mobile communication device for children 2d does not belong to either of the communication possible areas CA1 and CA2. The short-range wireless communication unit is used for the information collection processing, which indicates that a partner with which communication has been established exists in a circle with a radius of several m to several tens m, centering itself. Therefore, even if the in-group terminal device cannot acquire the location information of the communication partner, as long as its own location information is known, it is possible to estimate the location information of the communication partner from the own location information. For example, the location of the communication partner can be estimated from the own location to be within a circle with a radius of the communication possible distance of the second communication unit 12. When the mobile communication device for parents 1 and the like have the function that can estimate the direction of the transmission source from the direction of radio waves to be received, it is also possible to estimate a direction in which the communication partner exists.

When the identification information and the location information of the in-group terminal device are acquired, the control unit 10 proceeds to Step S108. The control unit 10 of the in-group terminal device that has acquired the identification information and the location information stores the acquired identification information and location information in the storage unit 13 while associating the information with the acquisition time or transmits the information to the server 3 via the first communication unit 11. When the location information cannot be acquired from the communication partner, the control unit 10 of the in-group terminal device stores the identification information that has been acquired at least in the storage unit 13 while associating the information with the acquisition time or transmits the information to the server 3 via the first communication unit 11. In this case, as described above, the control unit 10 of the in-group terminal device may estimate the location information of the communication partner from the own location information and store the information in the storage unit 13 while associating the information with the acquisition time when the identification information was acquired or may transmit the information to the server 3 via the first communication unit 11. With the above-mentioned steps, the information collection processing ends. The information collection processing is periodically executed whenever predetermined communication start times come. Then, a description will be given of search support processing.

Figure 10:
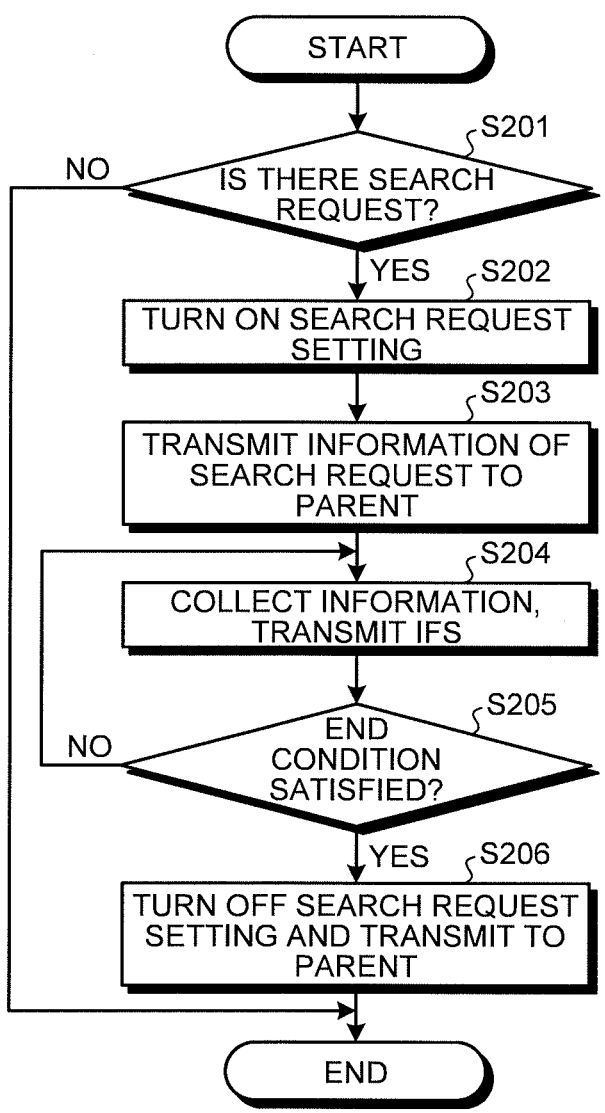
FIG. 10 is a flowchart illustrating the steps of search support processing executed by the server of the communication system.
Figure 11:
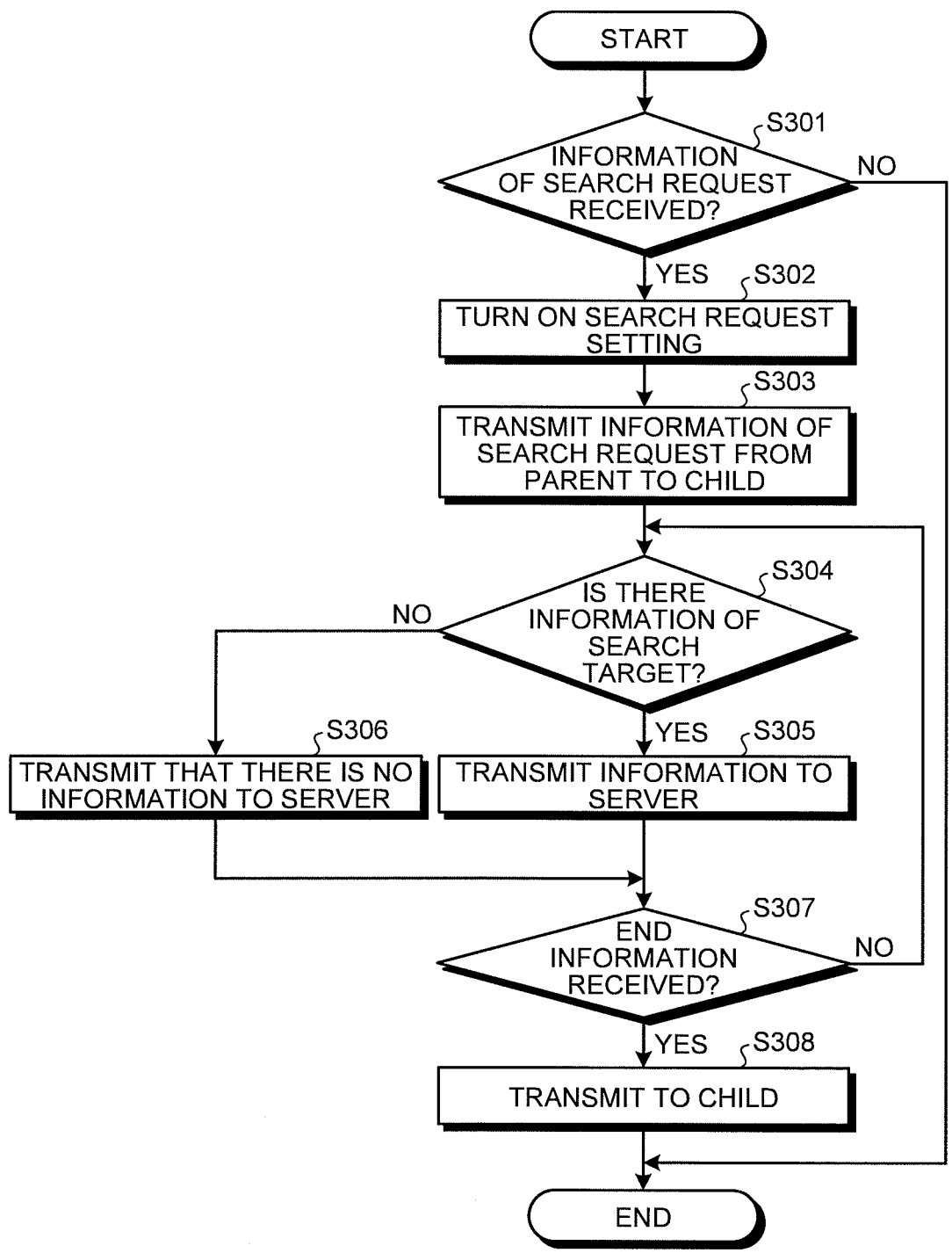
FIG. 11 is a flowchart illustrating the steps of the search support processing executed by the mobile communication device for parents of the communication system.
Figure 12:
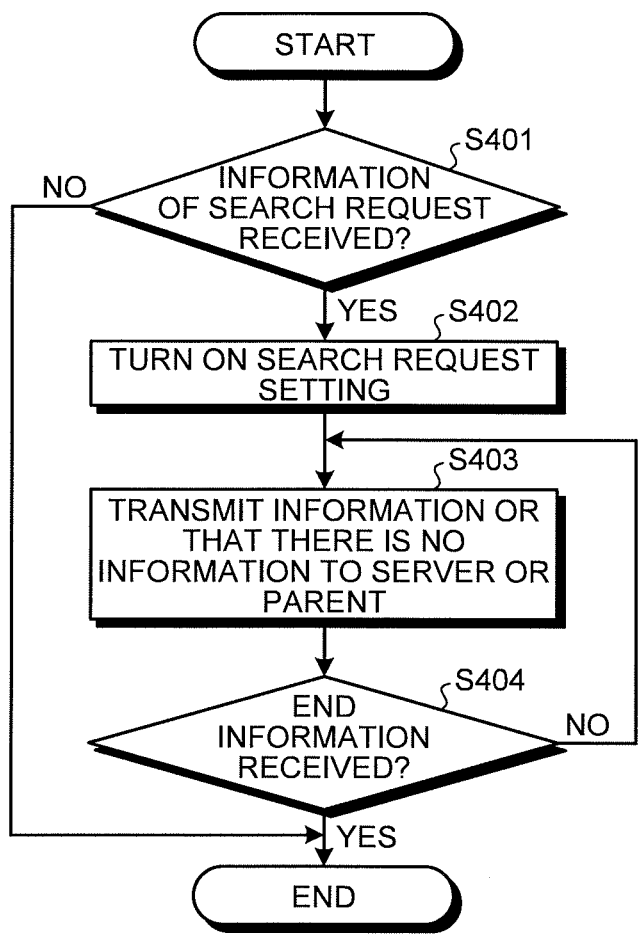
FIG. 12 is a flowchart illustrating the steps of the search support processing executed by the mobile communication device for children of the communication system.
Figure 13:
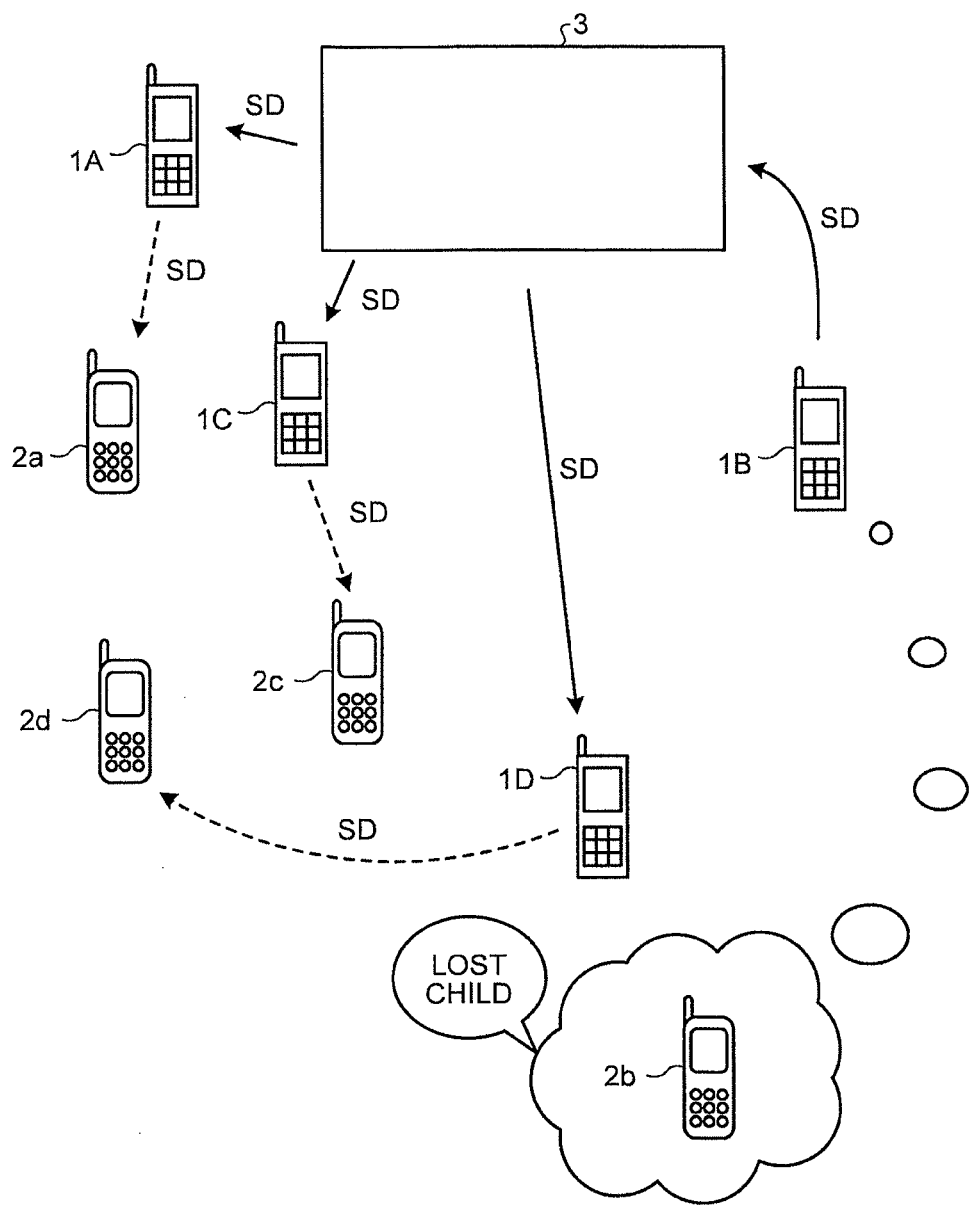
FIG. 13 is an explanatory view of the search support processing.

FIG. 10 is a flowchart illustrating the steps of the search support processing executed by the server of the communication system. FIG. 11 is a flowchart illustrating the steps of the search support processing executed by the mobile communication device for parents of the communication system. FIG. 12 is a flowchart illustrating the steps of the search support processing executed by the mobile communication device for children of the communication system. FIGS. 13 and 14 are explanatory views of the search support processing. FIG. 15 is a conceptual diagram of search support information transmitted to a search request source. The search support processing starts, triggered by that the server 3 of the communication system 100 illustrated in FIG. 1 has received a search request. In a case of a search for a lost child or the like, a search request is transmitted, for example, from the mobile communication device for parents 1 to the server 3. In the example illustrated in FIG. 13, the mobile communication device for parents 1B transmits a search request SD of the associated mobile communication device for children 2b to the server 3. In the embodiment, the search request SD is made by email, but may be made by a predetermined operation on the operating unit 18 or by voice.

[Search Support Processing of Server]

The search support processing of the server 3 to be described here is executed by the processing unit 3C of the server 3 illustrated in FIG. 1, and the collected information is stored in the storage unit 3M. At Step S201, the server 3 determines whether or not the search request SD has been made, in other words, whether or not the search request SD has been received. When the server 3 determines that the search request SD has not been received (Step S201, No), the search support processing ends. In this case, the plurality of mobile communication devices for parents 1 that is collectively managed by the server 3 and the plurality of mobile communication devices for children 2 periodically execute the above-mentioned information collection processing.

When the server 3 determines that the search request SD has been received (Step S201, Yes), the server 3 proceeds to Step S202. The server 3 turns on a search request setting. When the search request setting is on, support for a search for a lost child or the like by the communication system 100 is executed. Subsequently, the server 3 proceeds to Step S203. The server 3 transmits the search request SD to the plurality of collectively managed mobile communication devices for parents 1 (1A, 1C and 1D in the example illustrated in FIG. 13). The search request SD is transmitted via the communication control device 4 and the base station 5, which are illustrated in FIG. 1. The mobile communication device for parents 1 acquires the search request SD via the first communication unit 11 illustrated in FIG. 4.

Subsequently, the server 3 proceeds to Step S204. As illustrated in FIG. 14, the server 3 acquires and collects information (search target information) IF on the mobile communication device for children 2b targeted for the search request (referred to as the search target, as necessary) from the plurality of collectively managed mobile communication devices for parents 1 (1A, 1C and 1D in the example illustrated in FIG. 14) and the mobile communication devices for children 2 associated with them (2a, 2c and 2d in the example illustrated in FIG. 14). The information on the search target is information to be transmitted from the mobile communication device for parents 1 and the mobile communication device for children 2, which is information including information of the in-group terminal device (in-group terminal information) accumulated in the storage unit 13.

The in-group terminal information is information of the in-group terminal device (information that at least the identification information is associated with the acquisition time) collected in the above-mentioned information collection processing, and accumulated in the mobile communication devices for parents 1 and the mobile communication devices for children 2, respectively. In the embodiment, the in-group terminal information is information where the identification information and the location information of the in-group terminal device are associated with their acquisition time.

The in-group terminal information is the identification information and the location information of another mobile communication device for parents or children that is different from the mobile communication device for parents 1 and the mobile communication device for children 2, the information being obtained by their making direct short-range wireless communication with another mobile communication device for parents or children in the information collection processing. The in-group terminal information may or may not include the identification information, the location information, and the like of the search target. However, even in the latter case, it is possible to obtain information that a mobile communication device for parents or children that generated the in-group terminal information had not encountered the search target within the communication possible area of the second communication unit 12. Accordingly, information that the identification information, the location information and the like of the search target are not included in the in-group terminal information also becomes the search target information IF. Therefore, the search target information IF includes both of the in-group terminal information and information that the identification information, the location information and the like of the search target are not included in the in-group terminal information. At Step S204, the server 3 that has acquired and collected the search target information IF generates search support information IFS illustrated in FIG. 15 from the collected search target information IF to transmits the search support information IFS to the search request source.

At Step S204, the server 3 searches the collected search target information IF by the device ID of the search target, and extracts the identification information and the location information on the mobile communication device for children 2b targeted for the search request SD, information on a time when the location information was acquired, and the like. Even if the search target information IF does not include the identification information, the location information and the like of the search target, it is possible to obtain information that a mobile communication device for parents or children that generated the search target information IF had not encounter the search target.

The server 3 generates the search support information IFS illustrated in FIG. 15, and transmits the search support information IFS to the search request source, in other words, the mobile communication device for parents 1B that transmitted the search request SD. When the identification information, the location information and the like of the search target cannot be obtained at all from the collected search target information IF, in other words, when only the information that the search target information IF does not include the identification information, the location information, and the like of the search target can be obtained, the search support information IFS represents that the traces of the search target could not be found within the area of the collective management. The ID in the search support information IFS corresponds to the device ID (51, refer to FIG. 3) of the mobile communication device for children 2b being the search target. The server 3 may generate the search support information IFS whenever a predetermined time elapses since the search request SD is received, or may generate the search support information IFS after a predetermined amount of information is collected.

Subsequently, the server 3 proceeds to Step S205. The server 3 determines whether or not an end condition of the search support processing has been satisfied. The end condition may be, for example, a case where a predetermined time elapses since the server 3 receives the search request SD, a case where the server 3 receives the information that the search target has been found, or another condition. When the server 3 determines that the end condition of the search support processing is not satisfied (Step S205, No), the server 3 continues collecting the in-group terminal information and generating and transmitting the search support information IFS. When the server 3 determines that the end condition of the search support processing is satisfied (Step S205, Yes), the server 3 proceeds to Step S206. The search request setting is turned off, and this information, in other words, the information that the search support processing ends is transmitted to the mobile communication devices for parents 1A, 1B and the like, respectively. When the search request setting is off, the support for a search for a lost child or the like by the communication system 100 is not executed, and only the above-mentioned information collection processing is performed. Then, a description will be given of the search support processing of the mobile communication device for parents 1.

[Search Support Processing of Mobile Communication Device for Parents]

The search support processing of the mobile communication device for parents 1 to be described here is executed by the control unit 10 of the mobile communication device for parents 1 illustrated in FIG. 4. At Step S301, the control unit 10 of the mobile communication device for parents 1 determines whether to have received and acquired information related to the search request SD transmitted by the server 3 in the above-mentioned Step S203. The information related to the search request SD includes at least the identification information (for example, the device ID) of the search target (the mobile communication device for children 2b in this example).

When the control unit 10 determines not to have received the information related to the search request SD (Step S301, No), the search support processing of the mobile communication device for parents 1 ends. When the control unit 10 determines to have acquired the information related to the search request SD as illustrated in FIG. 13 (Step S301, Yes), the control unit 10 turns on the search request setting at Step S302. The search request setting is unique to the mobile communication device for parents 1, and when it is on, the support for a search for a lost child or the like by the communication system 100 is executed. When the information related to the search request SD has been acquired, the control unit 10 may inform of that by the speaker 15 and/or the display unit 17. Consequently, the owner of the mobile communication device for parents 1 knows that the search request SD has been made and therefore can join the search himself/herself, or tell the information directly to the search request source. Accordingly, the efficiency of a search for an unfound lost child or the like is improved.

Subsequently, the control unit 10 proceeds to Step S303. The control unit 10 of the mobile communication device for parents 1 transmits the information related to the search request SD to the mobile communication device for children 2 associated with itself. In the example illustrated in FIG. 13, the mobile communication device for parents 1A transmits the information related to the search request SD to the mobile communication device for children 2a, the mobile communication device for parents 1D to the mobile communication device for children 2d, and the mobile communication device for parents 1C to the mobile communication device for children 2c. Subsequently, the control unit 10 proceeds to Step S304. The control unit 10 of the mobile communication devices for parents 1A, 1C and 1D illustrated in FIG. 14 determines whether or not the information of the search target is accumulated in their respective storage unit 13 based on the information related to the search request SD.

When the control unit 10 determines to have the information of the search target (Step S304, Yes), the control unit 10 proceeds to Step S305. Such control unit 10 of the mobile communication device for parents 1 transmits the search target information IF accumulated in the storage unit 13 to the server 3 via the first communication unit 11 illustrated in FIG. 4 (refer to FIG. 14). In this case, information obtained from the search target may be extracted from the in-group terminal information accumulated in the storage unit 13 based on the information related to the search request SD (for example, the device ID of the search target) to transmit only the information obtained from the search target to the server 3. Accordingly, at Step S204 in FIG. 10, it is possible to lighten the burden of the server 3 to generate the search support information IFS. When information including only the search target is transmitted to the server 3, it is possible to reduce the amount of information compared with the case where the search target information IF is transmitted to the server 3. Consequently, a communication time between the mobile communication device for parents 1 and the server 3 becomes shorter, and the occupation time of the line can be shortened and accordingly it is preferable.

Return to Step S304. When the control unit 10 determines not to have the information of the search target (Step S304, No), the control unit 10 proceeds to Step S306. Such control unit 10 of the mobile communication device for parents 1 transmits the information that there is no information of the search target as the search target information IF to the server 3 via the first communication unit 11 illustrated in FIG. 4. Accordingly, at Step S305 or Step S306, the search target information IF is transmitted from the mobile communication device for parents 1.

When Step S305 or Step S306 ends, the control unit 10 proceeds to Step S307. At Step S307, the control unit 10 of the mobile communication devices for parents 1A, 1C and the like determines whether to have received and acquired the information that the search support processing ends from the server 3. When the control unit 10 determines not to have acquired the information that the search support processing ends (Step S307, No), the control unit 10 repeats Steps S304 to S306 until the information is received and acquired.

The mobile communication device for parents 1 may receive the search target information IF transmitted from the associated mobile communication device for children 2 as will be described later. When the mobile communication device for parents 1 receives the search target information IF from the mobile communication device for parents 2, the control unit 10 stores the search target information IF in the storage unit 13. When the mobile communication device for parents 1 has not received the information that the search support processing ends, the control unit 10 returns to Step S304. At this time, the control unit 10 determines whether or not the received search target information IF exists in the storage unit 13, and the subsequent step is executed.

When the control unit 10 determines to have received the information that the search support processing ends (Step S307, Yes), the control unit 10 proceeds to Step S308. At Step S308, the control unit 10 of the mobile communication device for parents 1 that has received the information that the search support processing ends transmits the information to the mobile communication device for children 2 associated with itself via the first communication unit 11. The control unit 10 then turns off the search request setting. Consequently, the support for a search for a lost child or the like by the communication system 100 is not executed, and only the above-mentioned information collection processing is executed. Then, a description will be given of the search support processing of the mobile communication device for children 2.

[Search Support Processing of Mobile Communication Device for Children]

The search support processing of the mobile communication device for children 2 to be described here is executed by the control unit 10 of the mobile communication device for children 2 illustrated in FIG. 5. At Step S401, the control unit 10 of the mobile communication device for children 2 determines whether to have acquired the information related to the search request SD transmitted by the mobile communication device for parents 1 in the above-mentioned Step S303. The information related to the search request SD includes at least the identification information (for example, the device ID) of the search target (the mobile communication device for children 2b in this example).

When the control unit 10 determines not to have acquired the information related to the search request SD (Step S401, No), the search support processing of the mobile communication device for children 2 ends. When the control unit 10 determines to have acquired the information related to the search request SD as illustrated in FIG. 13 (Step S401, Yes), the control unit 10 proceeds to Step S402. The control unit 10 turns on the search request setting. The search request setting is unique to the mobile communication device for children 2, and when it is on, the support for a search for a lost child or the like by the communication system 100 is executed. When the information related to the search request SD has been acquired, the control unit 10 may inform of that by the speaker 15 and the display unit 17, as described above.

Subsequently, the control unit 10 proceeds to Step S403. The control unit 10 of the mobile communication device for children 2 transmits the in-group terminal information accumulated in the storage unit 13 or the information that there is no information of the search target, in other words, the search target information IF to the mobile communication device for parents 1 associated with itself or the server 3 via the first communication unit 11 (refer to FIG. 14). The search target information IF may be transmitted to the mobile communication device for parents 1 since there is no connection between the mobile communication device for children 2 and the server 3, and therefore the security of the mobile communication device for children 2 is maintained preferably at a higher level. On the other hand, when the search target information IF is transmitted to the server 3, there is no need for transmission via the mobile communication device for parents 1 and accordingly the server 3 can quickly acquire the search target information IF.

In this case, the information obtained from the search target based on the information related to the search request SD received and acquired at Step S401 may be extracted from the in-group terminal information accumulated in the storage unit 13 to transmit only the information obtained from the search target to the mobile communication device for parents 1 or the server 3. This point is as described in the search support processing of the mobile communication device for parents 1. The mobile communication device for children 2 may transmit the search target information IF directly to the server 3, since the processing burden of the mobile communication device for parents 1 is preferably lightened compared with transmission to the server 3 via the mobile communication device for parents 1.

Subsequently, the control unit 10 proceeds to Step S404. The control unit 10 of the mobile communication devices for children 2a, 2c and the like determine whether to have received the information that the search support processing ends from the mobile communication devices for parents 1A, 1B and the like. When the control unit 10 determines not to have received the information that the search support processing ends (Step S404, No), the control unit 10 repeats Step S403 until the information is received.

When the control unit 10 determines to have received the information that the search support processing ends (Step S404, Yes), the control unit 10 of the mobile communication device for children 2 that has received the information that the search support processing ends turns off the search request setting. Consequently, the support for a search for a lost child or the like by the communication system 100 is not executed, and only the above-mentioned information collection processing is executed.

In the embodiment, the identification information, the location information and the like, which are acquired from the mobile communication devices for parents and children by short-range communication, are accumulated while being associated with the acquisition time. When a request to search for a lost child or the like is made, the server collects the identification information and the like, which have been accumulated in the plurality of mobile communication devices for parents and children, as the search target information. The server then searches the collected search target information for a search target to extract the identification information and the location information of the search target, the time information that the location information was acquired, and the like and generate search support information. In terms of the search support information, it is possible to know the location information of the search target in chronological order; accordingly, it is possible to follow the traces of the search target.

When the identification information of the mobile communication device for parents or children itself that transmits is added to the search target information upon transmission thereof, it is also possible to know which mobile communication device for parents or children was near the search target. Furthermore, when the own identification information is added thereto, even if there is no location information of the search target, it is possible to ask the owner of the mobile communication device for parents or children that was near the search target for the situation at that time. Consequently, it is also possible to obtain a clue to the search. Furthermore, in the embodiment, only information related to the mobile communication devices for parents is stored in the server to be collectively managed, and the mobile communication devices for children are indirectly and collectively managed due to the association of the parent-child relationship. Consequently, it is possible to reduce leakage of children's personal information as much as possible. When a pet's collar on which a communication function is installed appears in the future, it is possible to make a search for unfound lost dog and cat and the like in a method similar to the embodiment.

(Modification)

Figure 16:
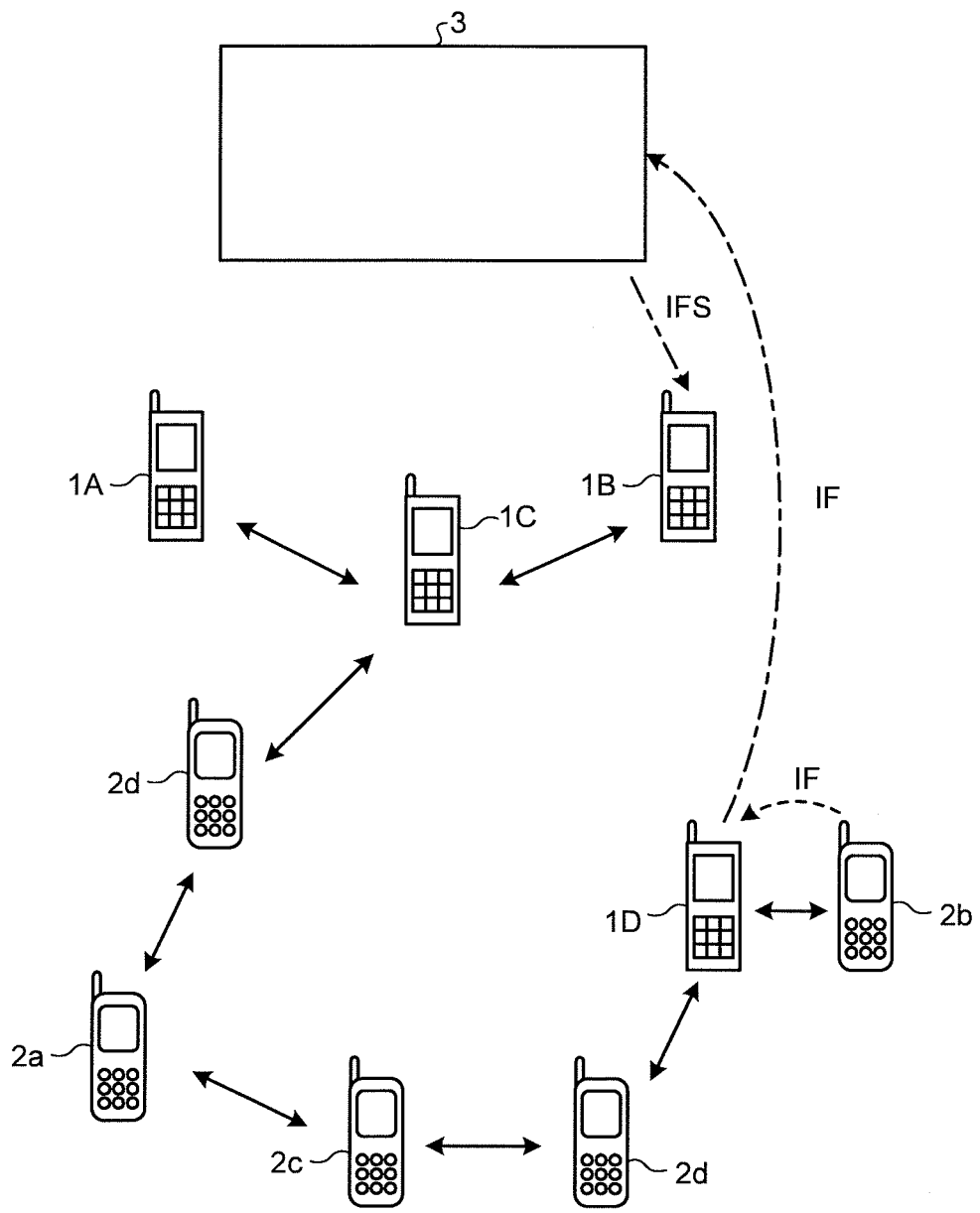
FIG. 16 is an explanatory view of the search support processing according to a modification of the embodiment.
Figure 17:
FIG. 17 is a conceptual diagram of search target information or the search support information transmitted to the search request source.

FIG. 16 is an explanatory view of the search support processing according to a modification of the embodiment. FIG. 17 is a conceptual diagram of the search target information or the search support information to be transmitted to the search request source. In the search support processing according to the modification, the mobile communication device for parents 1 and the mobile communication device for children 2 attempt communication with the search target, respectively, after transmitting the search target information IF. When communication with the search target can be established, at least the identification information of the search target is acquired to be transmitted as the search target information IF.

In the example illustrated in FIG. 16, the mobile communication device for parents 1 and the mobile communication device for children 2, which have received and acquired the information related to the search request SD, execute short-range wireless communication by use of their respective second communication unit 12 after transmitting the search target information IF to the server 3. The short-range wireless communication is periodically executed for a certain period of time, similarly to the above-mentioned information collection processing.

In the example, the mobile communication device for parents 1D is one that has established communication with the mobile communication device for children 2b being the search target. Therefore, the mobile communication device for parents 1D acquires at least the identification information (in the modification, the identification information and the location information) of the mobile communication device for children 2b via the second communication unit 12.

Subsequently, the mobile communication device for parents 1D transmits to the server 3 the acquired identification information and the like of the mobile communication device for children 2b as the search target information IF illustrated in FIG. 16. For example, when the mobile communication device for children 2c and the like establishes communication with the search target and transmits the identification information and the like of the search target as the search target information IF, the search target information IF is transmitted to the server 3 via the mobile communication device for parents 1C and the like or directly.

In the example illustrated in FIG. 16, the server 3 that has acquired the search target information IF from the mobile communication device for parents 1D generates the search support information IFS using the search target information IF to transmit the search support information IFS to the mobile communication device for parents 1B being the search request source. When the search target information IF that the server 3 has received is single, the search support information IFS becomes the same as the search target information IF as illustrated in FIG. 17.

In the modification, the mobile communication device for children 2d, the mobile communication device for parents 1C, and the like, which have not established communication with the mobile communication device for children 2b being the search target do not need to exchange information with a target that has established communication. Even when information is exchanged, there is no need to transmit the information to the server 3. In FIG. 16, the mobile communication device for children 2d, the mobile communication device for parents 1C, and the like, which have not established communication with the mobile communication device for children 2b being the search target, do not transmit the search target information IF to the mobile communication device for parents 1D and the server 3. A communication target of short-range wireless communication of the mobile communication device for parents and the mobile communication device for children may be limited to the mobile communication device for children 2b being the search target.

In the modification, even after the search target information IF accumulated in the storage unit 13 of the mobile communication device for parents 1 and the mobile communication device for children 2 is transmitted to the server 3 and the like, the mobile communication device for parents 1 and the mobile communication device for children 2 attempt access to the search target. Consequently, it is possible to improve efficiency in the search for an unfound lost child or the like while making a search for an unfound lost child or the like more securely. The search target information IF to be transmitted to the server 3 is not information that is accumulated for a certain period of time and therefore it is possible to reduce the amount of information compared with the case where the search target information IF accumulated in the storage unit 13 is transmitted. Consequently, a communication time between the mobile communication device for parents 1 and the server 3 becomes shorter, and the occupation time of the line can be shortened and accordingly it is preferable. Since it is possible to identify a communication target of short-range communication by use of the second communication unit 12 based on the information related to the search request SD, it is not necessary to acquire the information when the communication target cannot be found. Consequently, it is possible to further suppress the power consumption.

Second Embodiment

Figure 18:
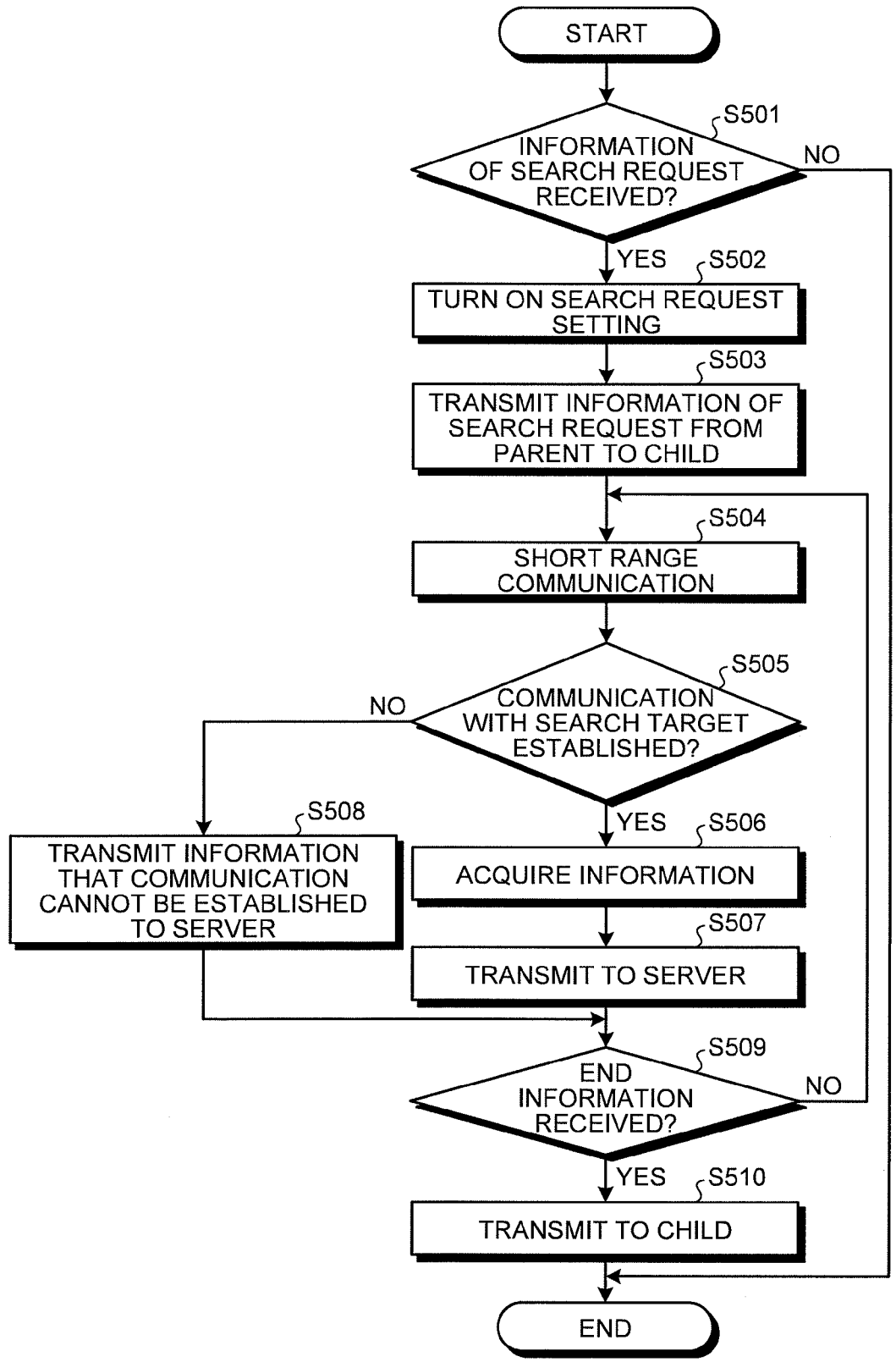
FIG. 18 is a flowchart illustrating the steps of search support processing, according to a second embodiment, executed by the mobile communication device for parents.
Figure 19:
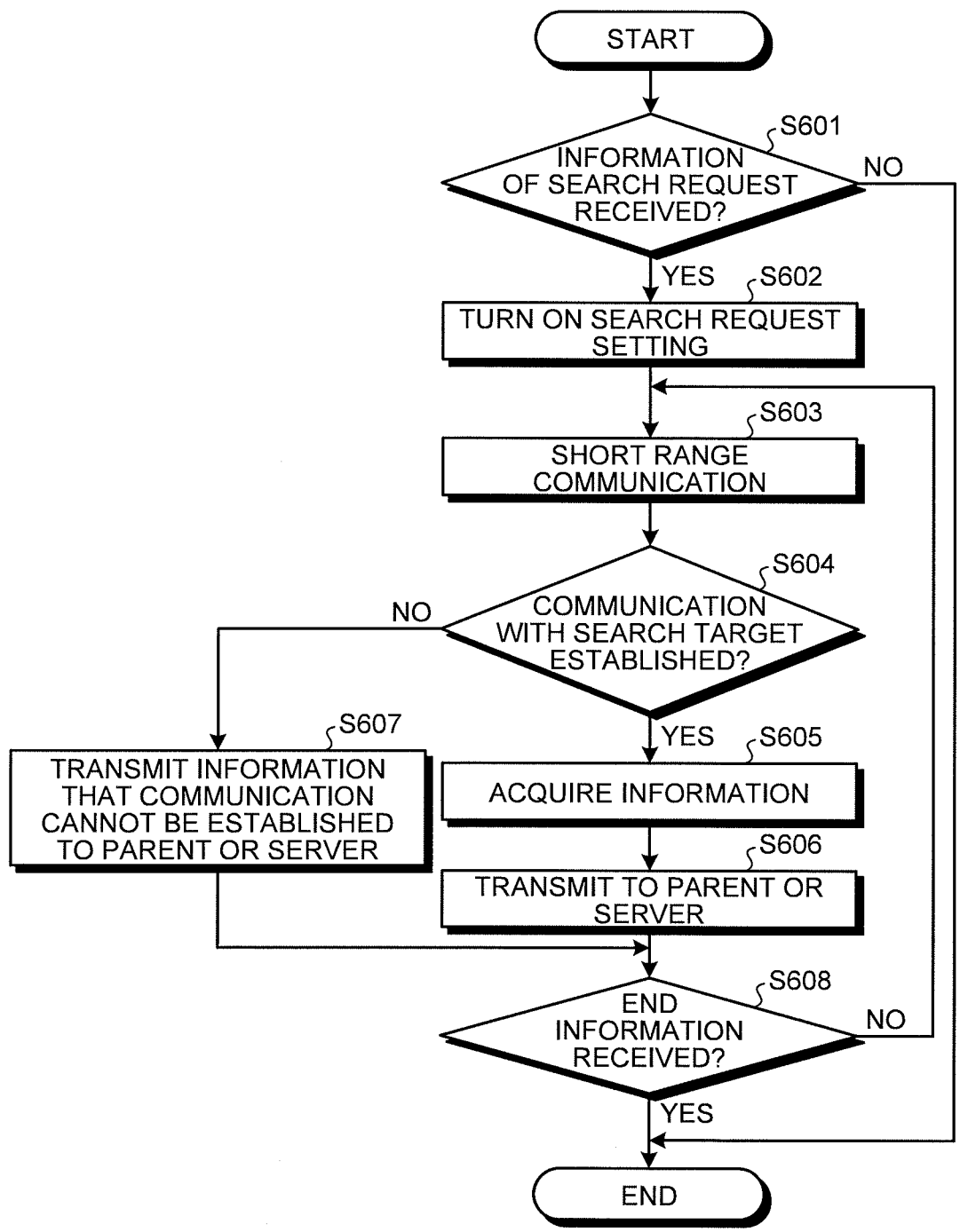
FIG. 19 is a flowchart illustrating the steps of the search support processing, according to the second embodiment, executed by the mobile communication device for children.

FIG. 18 is a flowchart illustrating the steps of search support processing, according to a second embodiment, executed by the mobile communication device for parents. FIG. 19 is a flowchart illustrating the steps of the search support processing, according to the second embodiment, executed by the mobile communication device for children. The search support processing according to the embodiment does not execute the information collection processing, and the mobile communication device for parents 1 and the mobile communication device for children 2, which have received and acquired the information related to the search request SD, attempt communication with the search target, respectively. When communication with the search target can be established, at least the identification information of the search target is acquired to be transmitted as the search target information IF. A description will be given of the search support processing according to the embodiment with reference to FIGS. 18, 19, 16, 17, etc. In the search support processing according to the embodiment, the search support processing of the server 3 is similar to that of the first embodiment.

[Search Support Processing of Mobile Communication Device for Parents]

The search support processing is executed by the control unit 10 of the mobile communication device for parents 1 illustrated in FIG. 4. Steps S501 to S503 of the search support processing of the mobile communication device for parents are similar to Steps S301 to S303 of the search support processing of the mobile communication device for parents according to the first embodiment. At Step S504, the control unit 10 of the mobile communication devices for parents 1A, 1C and the like that are illustrated in FIG. 16 attempt communication with the mobile communication device for children 2b being the search target by use of the second communication unit 12, respectively.

The control unit 10 proceeds to Step S505. The control unit 10 of the mobile communication devices for parents 1A, 1C and the like determines whether to have established communication with the mobile communication device for children 2b, respectively. When the control unit 10 determines to have established communication with the mobile communication device for children 2b (Step S505, Yes), the control unit 10 proceeds to Step S506. The control unit 10 then acquires at least the identification information (in the embodiment, the identification information and the location information) of the mobile communication device for children 2b via the second communication unit 12. In the example illustrated in FIG. 16, the mobile communication device for parents 1D has established communication with the mobile communication device for children 2b; accordingly, the control unit 10 of the mobile communication device for parents 1D acquires at least the identification information (in the embodiment, the identification information and the location information) of the mobile communication device for children 2b. Then, the control unit 10 proceeds to Step S507. The control unit 10 transmits to the server 3 the acquired information of the mobile communication device for children 2b as the search target information IF.

Return to Step S505. When the control unit 10 determines not to have established communication with the mobile communication device for children 2b (Step S505, No), the control unit 10 proceeds to Step S508. Such control unit 10 of the mobile communication device for parents then transmits the information that communication with the search target cannot be established as the search target information IF to the server 3 via the first communication unit 11 illustrated in FIGS. 4 and 5. In this manner, the search target information IF is transmitted to the server 3 at Steps S506 and S507, or Step S508. When Step S507 or S508 ends, the control unit 10 proceeds to step S509. Steps S509 and S510 are basically similar to Steps S307 and S308 of the search support processing of the mobile communication device for parents according to the first embodiment; however, when, at Step S509, the control unit 10 determines not to have acquired the information that the search support processing ends (Step S509, No), Steps S504 to S508 are repeated. Then, a description will be given of the search support processing of the mobile communication device for children.

[Search Support Processing of Mobile Communication Device for Children]

The search support processing of the mobile communication device for children is executed by the control unit 10 of the mobile communication device for children 2 illustrated in FIG. 5. Steps S601 and S602 are similar to Steps S401 and S402 of the search support processing of the mobile communication device for children according to the first embodiment. At Step S603, the control unit 10 of the mobile communication devices for children 2a, 2c and the like that are illustrated in FIG. 16 attempt communication with the mobile communication device for children 2b being the search target by use of the second communication unit 12, respectively.

Then, the control unit 10 proceeds to Step S604. The control unit 10 of the mobile communication devices for children 2a, 2c and the like determine whether to have established communication with the mobile communication device for children 2b, respectively. When the control unit 10 determines to have established communication with the mobile communication device for children 2b (Step S604, Yes), the control unit 10 proceeds to Step S605. The control unit 10 then acquires at least the identification information (in the embodiment, the identification information and the location information) of the mobile communication device for children 2b via the second communication unit 12. Then, the control unit 10 proceeds to Step S606. The control unit 10 transmits the acquired information of the mobile communication device for children 2b as the search target information IF to the mobile communication device for parents 1 or the server 3.

Return to Step S604. When the control unit 10 determines not to have established communication with the mobile communication device for children 2b (Step S604, No), the control unit 10 proceeds to Step S607. Such control unit 10 of the mobile communication device for children then transmits the information that communication with the search target cannot be established as the search target information IF to the mobile communication device for parents 1 or the server 3 via the first communication unit 11 illustrated in FIGS. 4 and 5. In this manner, the search target information IF is transmitted to the server 3 at Steps S605 and S606 or Step S607. When Step S606 or Step S607 ends, the control unit 10 proceeds to Step S608. Step S608 is basically similar to Step S404 of the search support processing of the mobile communication device for parents according to the first embodiment; however, when, at Step S608, the control unit 10 determines not to have acquired the information that the search support processing ends (Step S608, No), when it is determined to be No, Steps S603 to S607 are repeated.

In the embodiment, communication with the search target is attempted by short-range communication by use of the second communication unit 12 after the search request SD is made. Once communication with the search target is established, the identification information and the like of the search target are acquired to be transmitted to the server 3. Consequently, the information collection processing becomes unnecessary and therefore it is possible to significantly suppress the power consumption. Since it is possible to identify a communication target of short-range communication by use of the second communication unit 12 based on the information related to the search request SD, it is not necessary to acquire the information when the communication target cannot be found. Consequently, it is possible to further suppress the power consumption. Furthermore, the search target information IF to be transmitted to the server 3 is not information that is accumulated for a certain period of time and therefore it is possible to reduce the amount of information compared with the case where the search target information IF accumulated in the storage unit 13 is transmitted as in the first embodiment. Consequently, a communication time between the mobile communication device for parents 1 and the server 3 becomes shorter, and the occupation time of the line can be shortened and accordingly it is preferable.

INDUSTRIAL APPLICABILITY

As described above, the communication system and the mobile communication device, and the server for the communication system according to the present invention are useful for a search for an unfound lost child or the like.

The invention claimed is:

1. A communication system comprising:
a server;
a first mobile communication device including
a first communication unit for communicating with the server,
a second communication unit for communicating with a target mobile communication device by short-range wireless communication to acquire device information related to the target mobile communication device including at least identification information thereof, and
a storage unit for storing the device information; and
a second mobile communication device including
a first communication unit for communicating with the first mobile communication device,
a second communication unit for communicating with the target mobile communication device by short-range wireless communication to acquire the device information related to the target mobile communication device including at least the identification information thereof,
a storage unit for storing the device information, and
a location detection unit for detecting a location of the second mobile communication device,
wherein
the server is configured to transmit, when acquiring a search request for the target mobile communication device, search information related to the search request, to the first mobile communication device,
the first mobile communication device is configured to transmit, when receiving the search information, device information related to the search request to the server and search information to the second mobile communication device when receiving the search information from the server, and
the second mobile communication device is configured to transmit, when receiving the search information from the first mobile communication device, the device information stored in the storage unit of the second mobile communication device to the server and the device information including information of the location detected by the location detection unit, the server configured to collectively manage a plurality of mobile communication devices, the server comprising:

a storage unit for storing information related to the plurality of mobile communication devices; and a processing unit configured such that:

upon acquisition of information related to a search request of a mobile communication device associated with the collectively managed mobile communication device, the processing unit transmits the information related to the search request to the plurality of mobile communication devices, and the processing unit acquires information on the mobile communication device targeted for the search request from a collectively managed mobile communication device having received the information related to the search request and a mobile communication device having received the information related to the search request from the collectively managed mobile communication device.

2. The communication system according to claim 1, wherein
the first mobile communication device is configured to attempt, when receiving the search information, communication with the target mobile device by the second communication unit, and to transmit the device information to the server when the communication is established.

3. The communication system according to claim 1, wherein
the first mobile communication device and the second mobile communication device are associated with each other,
the first mobile communication device is configured to transmit the search information to the second mobile communication device associated therewith, and
the second mobile communication device is configured to transmit the device information stored in the storage unit of the second mobile communication device to the server via the first mobile communication device associated therewith.

4. The communication system according to claim 1, wherein
the first mobile communication device and the second mobile communication device are configured to communicate with the target mobile communication device by the respective second communication unit to acquire the device information periodically for a predetermined period of time.

5. The communication system according to claim 1, wherein
the first mobile communication device and the second mobile communication device are configured to communicate with the target mobile communication device by the respective second communication unit to acquire the device information based on a reference time transmitted from a base station.

6. The communication system according to claim 1, wherein
the first mobile communication device and the second mobile communication device are configured to attempt, after transmitting the device information in response to the search information, communication with the target mobile communication device by the respective second communication unit to acquire at least the identification information of the target mobile communication device.

7. The communication system according to claim 6, wherein
the first mobile communication device is configured to transmit the acquired identification information to the server as the device information, and
the second mobile communication device is configured to transmit the acquired identification information to the server directly or via the first mobile communication device as the device information.

8. The communication system according to claim 1, wherein
the second mobile communication device is configured to send the device information including the information of the location to the server directly or via the first mobile communication device.

9. The communication system according to claim 1, wherein the processing unit is configured to acquire the information on the mobile communication device targeted for the search request and then transmits search support information to a mobile communication device having transmitted the information related to the search request.

* * * * *